Sept. 20, 1932.  S. EINSTEIN ET AL  1,877,828
MILLING MACHINE
Filed April 28, 1926   7 Sheets-Sheet 1

Inventors
S. Einstein
L. F. Nenninger
By H. K. Parsons
Attorney

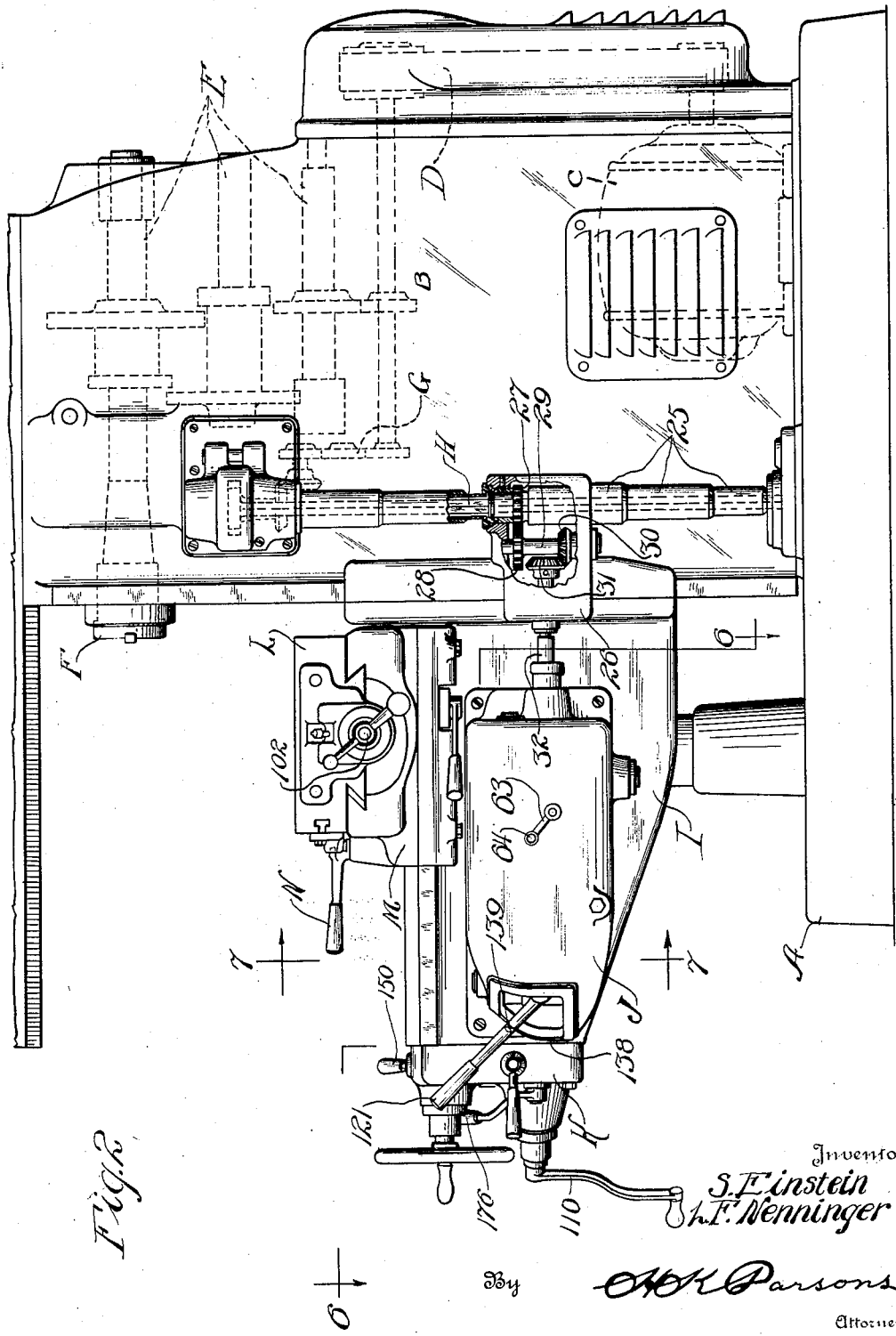

Sept. 20, 1932.   S. EINSTEIN ET AL   1,877,828
MILLING MACHINE
Filed April 28, 1926   7 Sheets-Sheet 3
Fig. 3
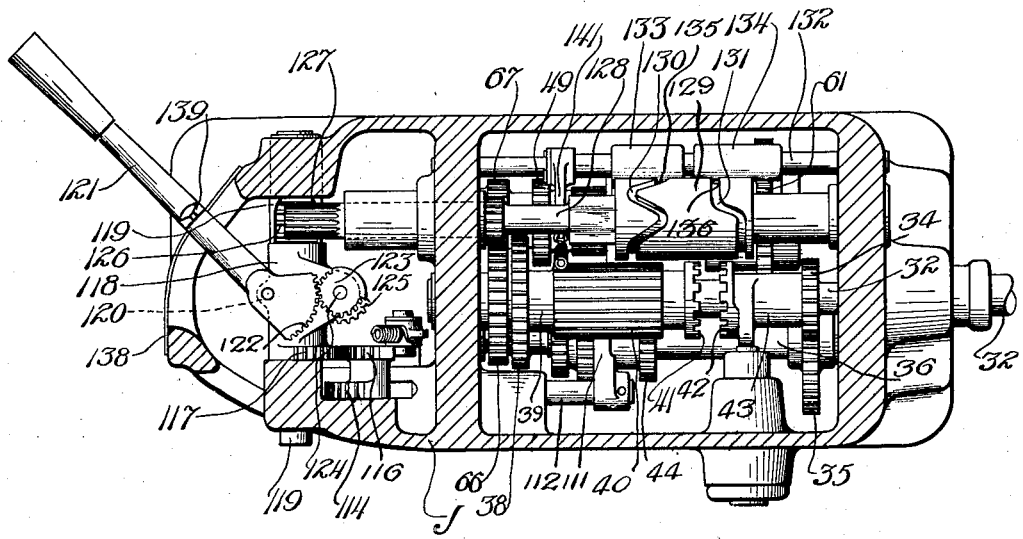
Fig. 4
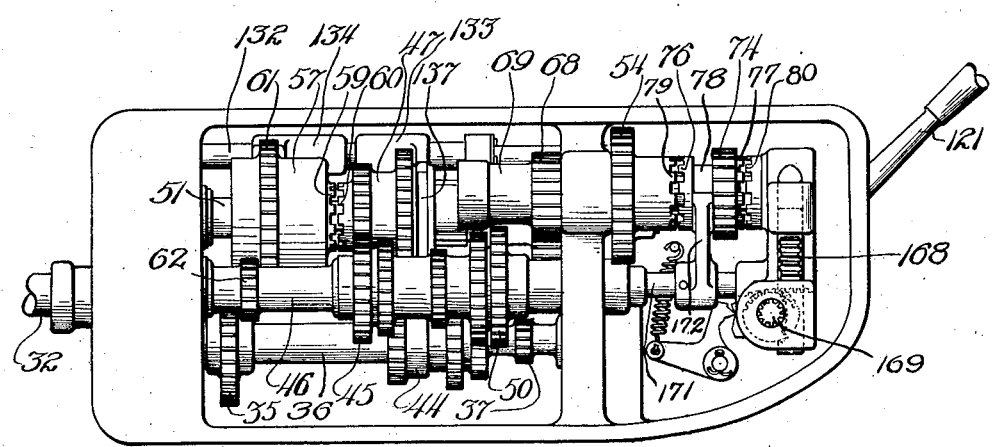
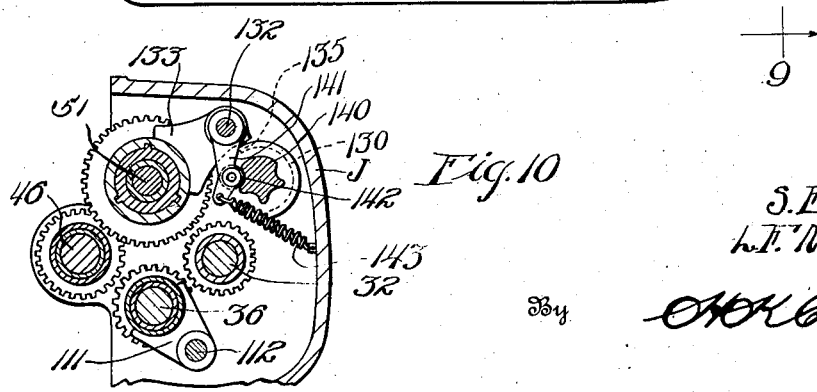
Fig. 10
Inventors
S. Einstein
L. F. Wenninger
By A. H. K. Parsons
Attorney

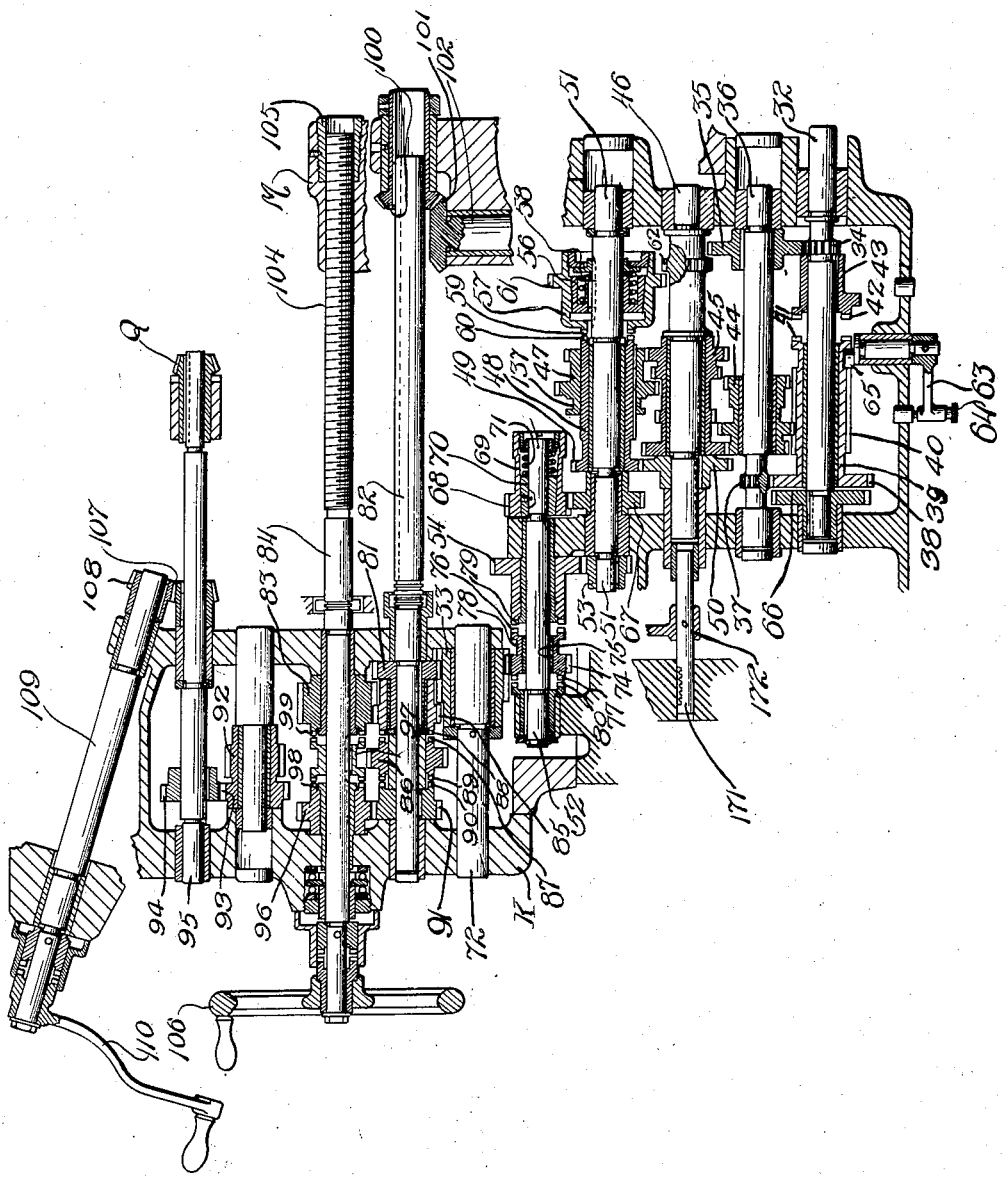

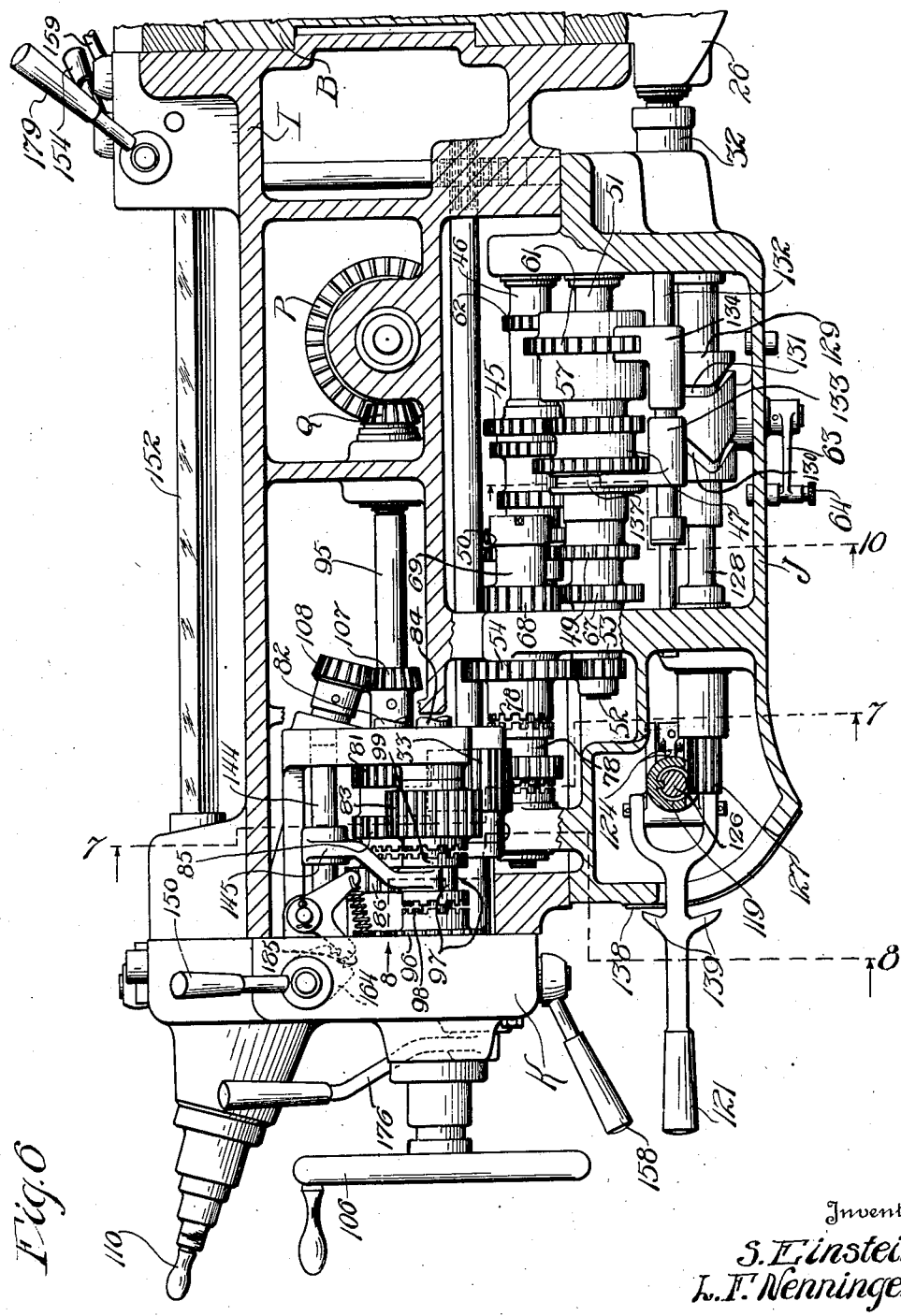

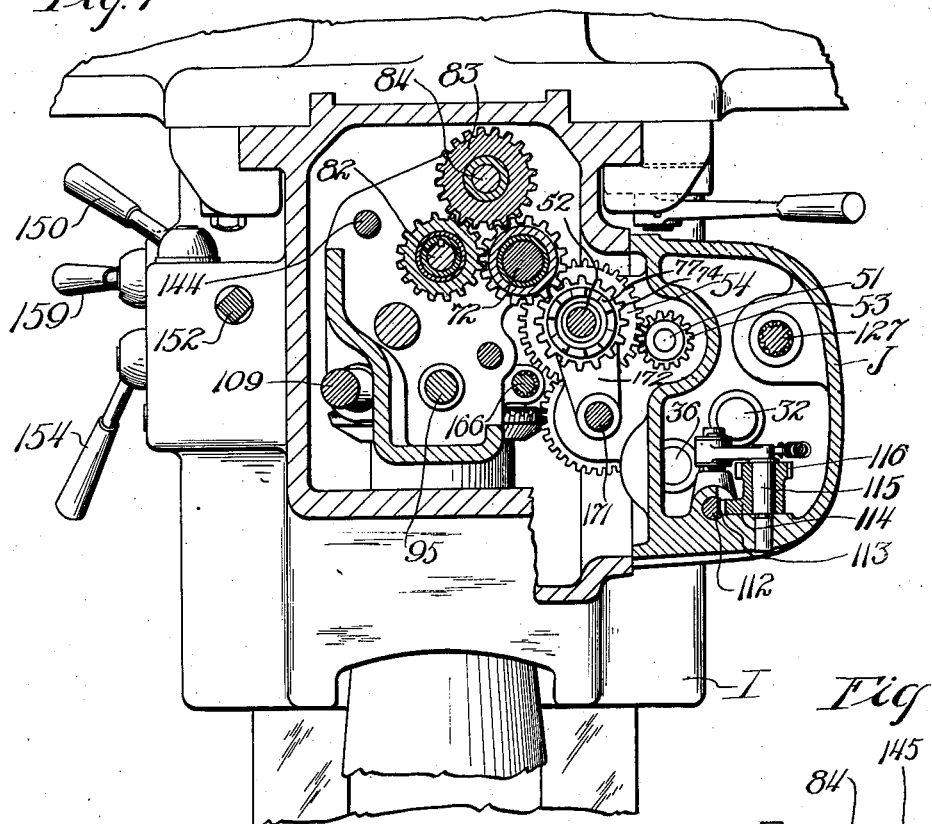

Sept. 20, 1932.   S. EINSTEIN ET AL   1,877,828
MILLING MACHINE
Filed April 28, 1926   7 Sheets-Sheet 7

Inventors
S. Einstein
L. F. Nenninger
By A. K. Parsons
Attorney

Patented Sept. 20, 1932

1,877,828

UNITED STATES PATENT OFFICE

SOL EINSTEIN AND LESTER F. NENNINGER, OF CINCINNATI, OHIO, ASSIGNOR TO THE CINCINNATI MILLING MACHINE COMPANY, OF CINCINNATI, OHIO, A CORPORATION OF OHIO

MILLING MACHINE

Application filed April 28, 1926. Serial No. 105,256.

This invention relates to improvements in milling machines and has particular reference to the operating and controlling mechanism for effecting the shifting of the several work-carrying and supporting members, both for initial positioning of the parts and for movement of the work during the operation of the machine.

Milling machines comprise certain essential features which include a main bed, frame or support, a rotatable tool holder for the milling machine arbor and cutters, and a work holder. For the satisfactory performance of the milling operations it is necessary that a relative movement be imparted to the tool holder and the work holder, such that the tool may be caused to cut or bite into the work and also that there be a relative shifting of the parts, so that the tool may traverse the work during such cutting operation. For accessibility to different portions of the work it is frequently desirable that this traversing be in two angularly related directions. The present invention has reference to the means by which said relative movements may be most readily and satisfactorily accomplished and by which they may be accomplished both at quick traverse rates for initial adjustment and also at variable slower feeding rates during the cutting operation.

One of the objects of the present invention is the provision of a milling machine of this character, embodying both power quick traverse and slow or feeding movements for the translatory parts, which shall both be effected through the medium of a single drive mechanism actuated by the prime mover of the machine.

A further object of the invention is the provision of a milling machine of this character in which the control mechanism for selectively regulating the movement of the several parts may be readily operated from a position at the front of the machine or from the side or rear thereof.

An additional object of the invention is the provision of an automatic control mechanism for reducing the liability of injury to the machine by the prevention of simultaneous performance of all the adjustments thereof.

The invention further contemplates the provision of a contained mechanism whereby a geometric progression series of speeds may be applied to the moving parts of the machine and in addition the basic speed of the series may be readily varied to step up the entire progression to provide a different range for the machine when desired.

Further objects of the invention include a simplification and compacting of parts, actuating and control mechanism in a machine of this general type and improvements in the details of construction thereof, such as should be readily apparent by reference to the following specification, taken in connection with the accompanying drawings, and it will be understood that we may make any modifications in the specific structural details and combination and arrangement of parts hereinafter described within the scope of the appended claims without departing from or exceeding the spirit of the invention.

Figure 2 is a fragmentary side elevation of the machine with parts broken away to better bring out the driving connections for the movable portions thereof.

Figure 3 is a vertical sectional view through the feed box carried by the knee of the machine, taken as on the line 3—3 of Figure 1.

Figure 4 is a face view of this box and contained parts removed from the machine.

Figure 5 is a sectional development in a single plane of the entire gear mechanism as contained within the feed box and the reverse box.

Figure 6 is a transverse sectional view through the feed box and reverse box taken as on the line 6—6 of Figure 2.

Figure 7 is a vertical sectional view on the line 7—7 of Figure 6.

Figure 8 is a similar view on the line 8—8 of Figure 6.

Figure 9 is a section on line 9—9 of Figure 6.

Figure 10 is a section on line 10—10 of Figure 4.

Figure 1:
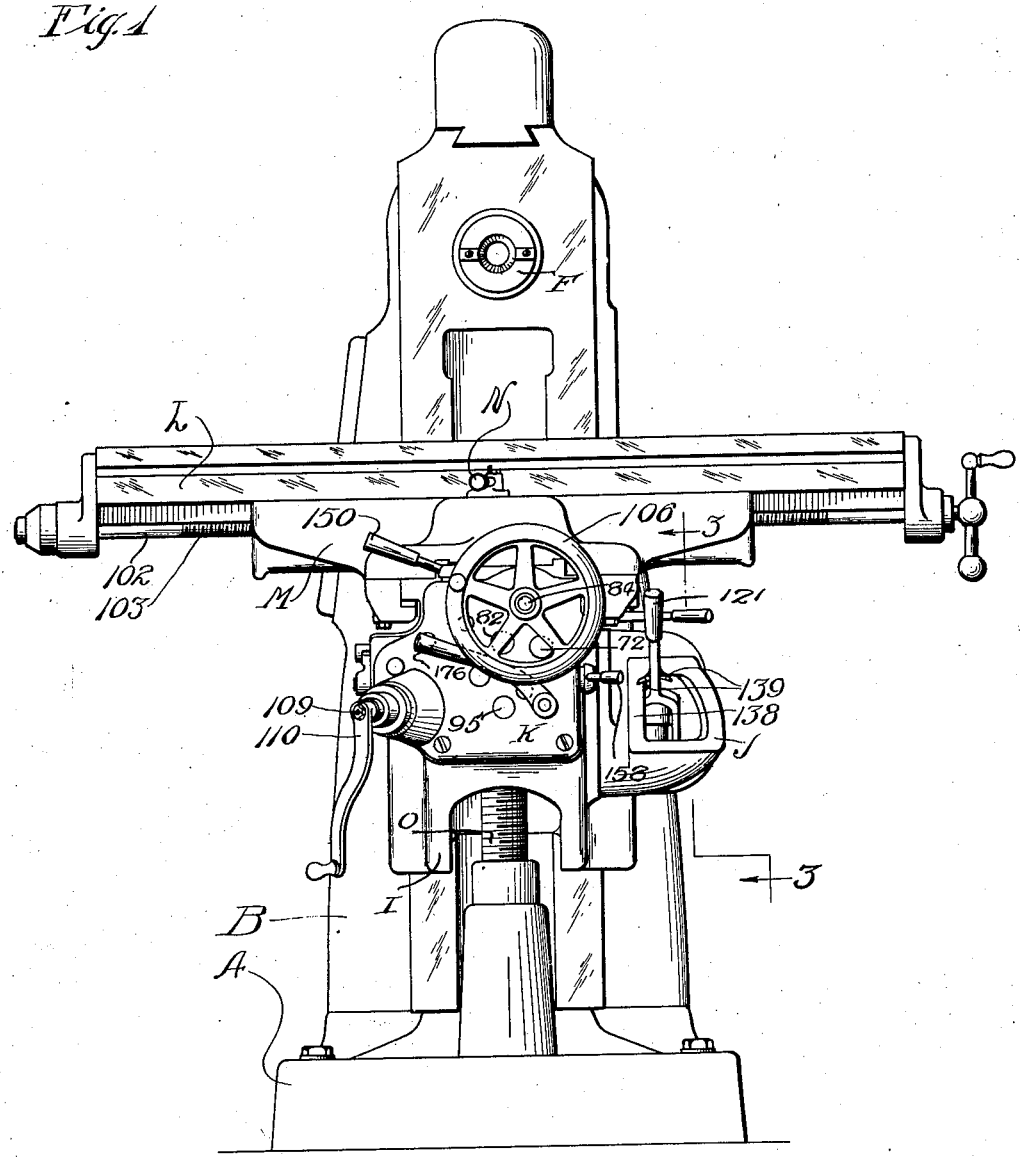
Figure 1 represents a front view of a milling machine embodying the present invention.

In the drawings we have chosen for purposes of illustration a machine of what is known as the knee and column type, which is to say a machine comprising a bed having a column portion rising therefrom, and having slidably supported on the column a knee capable of vertical movement. This knee carries a saddle horizontally adjustable thereon in a direction toward and away from the column, and the saddle in turn supports a table translatable parallel with the face of the column. The column also supports a tool holder for the cutting tool. It is to be understood however, that the basic features hereinafter described are equally applicable to other forms of milling machines, in which there is a different arrangement of parts, but in which the essential relative movements of the tool and work holder hereinbefore referred to, as by vertical movement of the tool for example, in place of the table, is employed.

Throughout the drawings similar characters of reference are employed to denote corresponding parts in the several views. The letter A designates the bed of the machine having rising therefrom the hollow column B, containing the prime mover C in the form of a driving motor connected by suitable mechanism such as the belt D with the conventional shaft and gear system designated as an entirety by the character E, which drives the cutter spindle F. In addition, a branch transmission G drives a vertical squared shaft H contained within a casing formed by a plurality of telescoping sections 25. These sections interlock with a sliding bracket casing 26 carried by the knee I of the machine. Slidable on the squared shaft and constrained for movement with the bracket 26 is a gear 27 meshing with a second gear 28 on a stub shaft 29. This shaft in addition, bears bevel gear 30 meshing with gear 31 on the power transmission shaft 32 which extends into the feed-change box J on the side of the knee.

*Feed-change mechanism*

The feed-change mechanism as an entirety is contained within the so called feed box J and serves to supply motion at a variety of speeds to an elongated pinion 33 contained within what is termed in the trade a reverser box K on the front of the knee. This box contains the mechanism for determining the unit to be actuated in accordance with the rate of motion as supplied from the drives in the feed box.

The general layout of the mechanism within the feed box will probably be best understood by reference primarily to Figure 5 of the drawings, this being considered in connection with the various other figures showing the actual structural arrangements and locations of the several parts now to be described.

Formed or secured on shaft 32 is a pinion 34, which meshes with gear 35 suitably keyed to shaft 36. This shaft is further provided with a pinion 37 meshable with gear 38 on the sliding sleeve unit 39 having the elongated pinion portion 40 and the clutch portion 41. Clutch portion 41 is adapted for selective engagement with a second clutch 42 having its hub 43 keyed to shaft 32 for rotation therewith. With the parts in the position shown in Figure 5, the drive is from pinion 34 to gear 35 and thence through shaft 36, pinion 37 and gear 38 to pinion 40, the proportion of the parts being such that the speed of rotation of pinion 40 is much less than that of drive shaft 32. From pinion 40 power is transmitted through the sliding gear transmission unit 44 to the cooperating transmission unit 45, rotatably mounted on shaft 46. This unit in turn drives at various selected speeds the third transmission unit 47, which is keyed to sleeve 48 having a gear 49 in constant mesh with gear 50 on shaft 46 for transmission of power thereto. Sleeve 48 is itself rotatably supported by shaft 51 which transmits the slower or feeding speeds to the final drive shaft 52. This transmission is effected through pinion 53 on said shaft which meshes with the freely rotating gear 54 of shaft 52. The transmission of this power is through a safety coupling unit which is slidably keyed on shaft 51 and comprises an inner cone clutch member 56 and an outer casing 57, the two parts being frictionally locked together at all times by action of a contained spring 58. Member 57 has a clutch face 59 for cooperation with the clutch face 60 on unit 47 for direct drive of shaft 51 from unit 47. In addition, member 57 has gear 61 which may be shifted into mesh with pinion 62 on shaft 46. In this position of the parts the drive in place of being direct from unit 47 is through members 49 and 50 to shaft 46 and thence through pinion 62 and gear 61 to the shaft 51, applying power at a considerably reduced speed as will be readily apparent. It will thus be noted that the transmission from shaft 32 to shaft 51 at the slower rate is effected through sliding transmission unit 44, stationary transmission unit 45, and sliding transmission unit 47 and sliding unit 57 having clutch 59-60 or gear connection 61-62 at twelve different rates of speeds. To secure these several rates there are three shiftable parts by which the twelve speeds are effected and the several gears and pinions in the transmission line are calculated to give proper and desired speeds in suitable geometric progression.

In addition, to obtain an entirely new geometric speed progression series at a stepped up or higher initial and subsequent rates there is provided on the side of the speed box a selector lever 63 locked in adjusted position as respects the box by pin 64. This lever bears the eccentric shift roller 65 for laterally shiftable member 39 to bring its clutch face 41 into mesh with clutch member 42 on the shaft 32 and at the same time move gear 38 out of mesh with pinion 37. In this adjustment the drive is then direct from shaft 32 to side pinion 40 and thence through transmission 44 to the other parts as before. The drive is again effected finally through the safety coupling within member 57 to pinion 53 as before.

These various speeds at much reduced rates from those of shaft 32 it will be understood are primarily desirable for employment during the working or cutting action of the machine and are selected according to the cut required and the material being operated upon.

In addition, it is particularly desirable, as in initial setting of the machine prior to the working stroke or in withdrawing the parts on completion of the cut, that the same operate at a much higher rate of speed than is possible under working conditions. To accomplish this result gear 66 is directly keyed on shaft 32 for rotation therewith and meshes with gear 67 rotatably supported by shaft 51 and in mesh with pinion portion 68 of clutch sleeve 69. This clutch sleeve contains a second cone clutch member 70 pinned to shaft 52. A contained spring 71 forces sleeve 69 outwardly to hold it in frictional engagement with the cone under normal driving conditions but allowing of relative slip of the parts when there is undue resistance to rotation of shaft 52. It will thus be seen that the shaft 52 through the gear train 66, 67 and 68 is directly rotated at a higher rate of speed than that of the main drive shaft 32, while the loose gear 54 thereon through the multiple change speed gearing contained in the feed box is rotated at a very much slower speed than that of shaft 32.

*Drive and reverse mechanism*

The controls for the various movements of the table are as a whole disposed within what has been termed the reverser box K on the front of the knee. Contained within this member K is shaft 72 rotatably supporting the elongated drive pinion 33 which at the one side is in mesh with the gear portion 74 of sleeve 75 having clutch faces 76 and 77 and spool or shifter groove portion 78 to facilitate shifting thereof. This member 75 is selectively engageable with either the clutch face 79 of sleeve bearing the gear 54 for application of the slower or feeding speed to gear 74 or with the clutch member 80 directly secured on shaft 52. Pinion 33 also meshes with gear 81 keyed to shaft 82 and with gear 83 rotatably supported by shaft 84. A reversing gear 85 is also rotatably supported by shaft 82 and in mesh with and driven by gear 83, rotating in the opposite direction from gear 81 and the supporting shaft. Shaft 82 further supports the shiftable gear 86 having a clutch portion 87 for cooperation with clutch 88 on gear 85 and a second clutch portion 89 for cooperation with clutch face 90 of gear 91 secured on and driven by shaft 82. It will thus be seen that when member 86 is laterally shifted to the left in Figure 5, it will be caused to rotate with the shaft 82 while when shifted to the right it will rotate in the opposite direction from said shaft. This gear meshes with pinion 92 which through gear 93 drives pinion 94 and shaft 95 in the direction determined by the lateral shifting of member 86. In addition to transmitting power to member 86, gear 91 is in mesh with the loosely rotatable gear 96 on shaft 84 while intermediate the loosely rotating gears 83 and 96 on this shaft is a double face clutch spool 97 keyed on the shaft and engageable with either clutch face 98 of gear 96 whereby the shaft is driven from that gear or clutch face 99 on gear 83 when motion in the opposite direction will be imparted to shaft 84.

*Machine adjustments*

The several shafts 82, 84 and 95 are the movement controlling shafts for the table feed, the saddle adjustment and the knee adjustment respectively. Shaft 82 is coupled through bevel gears 100–101 and shaft 102 with the customary screw 103 for back and forth shifting of the table L of the milling machine. This table has a longitudinal back and forth movement on the saddle M of the machine to feed work on the table past the cutter. Conventional reverse mechanism controlled by handle N regulates the actuation of table L. The saddle has an in and out feeding movement on the knee I as imparted by the screw threaded portion 104 of shaft 84 in engagement with nut 105 carried by the saddle. This shaft is also capable of manual actuation by the hand wheel 106 clutchable therewith as desired as indicated in Figure 5.

The knee itself is vertically slidable on suitable ways on the column B, its position being varied by rotation of the vertical adjusting screw O through the medium of bevel gear P meshing with pinion Q on shaft 95. In addition, shaft 95 may be manually actuated by the intermeshing bevel pinions 107–108, shaft 109 and the clutchable handle 110.

Speed controls

As has been previously mentioned the rate of speed at which the various machine adjustments are made is controlled by selective intermeshing of the various gears within the feed box. To utilize either the fast or the slow series of speeds the member 40 is shifted by the selecting handle 63.

To control the adjustments of transmission gear unit 44 use is made of the shifter yoke 111 carried by the slide bar 112 which has a rack portion 113 in mesh with segment 114 rotatably mounted on stud 115 as a part of the gear unit 116. This gear 116 is in mesh with a rack segment 117 on the oscillatable bracket 118 supported on the front of the feed box by spindle 119. The bracket is provided with an ear 120 to which is pivoted the furcated lower end of handle 121 which projects forwardly from the feed box. Lateral oscillation of the handle will serve to swing segment 117 and thus through the gear and rack portions just described, impart a longitudinal shifting movement to slide bar 112 and a corresponding movement to the transmission unit 44, meshing either the gear portion at the right hand or left hand end thereof with appropriate gears on gear unit 45 according to the speed ratio desired.

Mention has been made that handle 121 is pivoted to bracket 118, and the lower end of the handle is formed with a rack segment 122 in mesh with a pinion 123 on rock shaft 124 which has a second pinion 125 meshing with the circumferential thread of rack 126, which is slidable within spindle 119 and in turn meshes at its upper portion with the pinion 127 on the rotatable cam shaft 128. This shaft bears the barrel cam 129 having cam grooves 130 and 131. A guide bar 132 is disposed adjacent this cam and bears the shifter yoke 133 and 134 having portions 135 and 136 depending into grooves 130 and 131 respectively. It will thus be seen that up and down movement of handle 121 about its pivot will, through the connections just described, impart a rotary movement to cam 129 and upon such movement a back and forth reciprocation will be imparted to shifter yokes 133 and 134 depending on the path of the cam grooves. The back and forth movement of shifter 133 serves through its engagement with spool 137 of gear unit 47 to control the meshing of a selected gear on this unit with a selected gear on unit 45. Similarly the back and forth movement of shifter yoke 134 by its engagement with the sides of gear 61 on the feeding speed safety coupling unit 57 serves to shift this unit along shaft 51 from neutral position into mesh with pinion 62 or into interlocking engagement with clutch face 60 on unit 47 as desired. The paths of the two cams are so related that various combinations of connection of the parts may be made in accordance with an indicated setting carried by a dial plate 138 on the front of the feed box and cooperating with the index fingers 139 formed on handle 121.

From the foregoing it will be noted that the single handle 121 by oscillation in a horizontal plane serves to control the shiftable unit 44 and by similar movement in a vertical plane the units 47 and 57, its combined action therefore selectively determining the final speed of rotation of shaft 51 except as modified by variance in setting of the selecting lever 63 and pinion unit 40 controlled thereby. To facilitate determination of proper meshing position of the gears as controlled by the cam movement the cam shaft is provided with a notched member or star wheel 140, while pivoted on rod 132 is a detent arm 141 having a roller 142 for engagement in the notches of the star wheel and held against the star wheel by spring 143 as is most clearly illustrated in Figure 10 of the drawings.

Control of directional actuation of the machine units

This control is exercised through the parts contained in what has been termed the reverser the box K and the several control mechanisms coupled therewith and extended to the front and rear of the machine. These parts include a slide bar 144 carrying a shifter yoke 145 engaging the clutch spool 97 and a second slide bar 146 bearing a shifter yoke 147 spanning and laterally engaging gear 86. Bar 144 is coupled by an tongue and slot connection, rack or the like 148 with the actuating spindle 149, having a handle 150 whereby oscillation of the handle will longitudinally shift bar 144 and the clutch unit associated therewith to move this unit from neutral position into mesh with either clutch face 99 of gear 83 or clutch face 98 of gear 96 to suitably transmit power to shaft 84 and feed screw 104 which controls the in and out movement of the saddle as previously described. That this movement may be controlled with equal facility from the rear of the machine there is coupled with spindle 149 through the transverse connecting bar 151 the rearwardly extending bar 152 having operably associated therewith a second actuating spindle 153 and handle 154.

The tongue and slot connections between handles 150 and 154 and the connecting bars are such as to permit of longitudinal as well as rotative movement of the control bar 152 and this bar is also coupled through suitable tongue and slot connections as at 155 with the oscillatable bar 156 coupled by rack or tongue and slot connection 157 with slide bar 146, so that oscillation of bar 156 will impart a back and forth sliding movement to shifter yoke 147. This movement moves the clutch faces on gear 86 from neutral position into mesh respectively with either gear unit 85 or 91 according to the direction of rotation that is desired to impart to shaft 95 for varying the up and down movement of the knee and several parts carried thereby. This oscillation of bar 156 is accomplished directly and at the front of the machine by the directional control handle 158 which extends forwardly from the reverser box and may likewise be directionally accomplished at the rear of the machine by handle 159 through its connection 160 with bar 152 serving to impart a longitudinal movement to said bar. By reference to handles 150 and 154 and 158 and 159 it will be noted that these handles are so positioned and related with respect to the parts to be operated thereby that an inward movement or movement toward the column of the machine of handles 150 and 154 will cause movement of the saddle in that direction and reverse movement a correspondingly reverse or outward movement of the saddle. Similarly depression of handles 158 and 159 will cause downward movement of the knee while raising of either of these handles will cause an upward movement to be imparted to the knee. In this manner directional control is secured for both knee and saddle at both the front and the rear of the machine so that whether the operator is standing in front of the machine for its operation or is standing adjacent the column for observation of the action of the cutter at the inner part of the work, he is able to satisfactorily directionally control the movement of these parts.

To prevent breakage or improper settings due to simultaneous in and out and vertical adjustments of the movable parts of the machine, the bar 156 is provided with a safety lockout in the form of a segmental arm 161 having a notch 162 through which bar 151 may slide on rocking of spindle 149 for actuation of the saddle reverser shifter arm 145 if the knee reverser 86 is in neutral position. This arm however, swings through a notch or slot 163 in member 151 when the knee reverser is actuated and by engagement in this slot prevents actuation or movement of the saddle reverser from neutral position while the knee reverser is engaged. Similarly, shifting of member 151 for engagement of the saddle reverser moves slot 163 out of alinement with arm 161 so that it is then impossible to engage the knee reverser clutch until the saddle reverser has been again shifted to neutral position.

To retain the parts in desired shifted position, use is made of customary notched arms 164 and spring detents or the like 165 as indicated in Figure 6 for example.

It is also desirable that the change of rate of drive from a slow or feeding drive to a quick traverse may be made possible from both the front and rear of the machine.

In the accomplishment of this result use is made of the rotary spindle 166 having the rack portion 167 coupled by the motion transmitting rack bar 168 with the rotary elongated pinion 169 in mesh with rack 170 on shifter rod 171. This rod bears a shifter yoke 172 engaging the spool or shifter groove portion 78 of sleeve 75 to move this unit for either rapid drive connection through clutch 82 or for slower actuation through the clutch 75 and associate parts. This spindle 166 also extends to the rear of the machine and is coupled by a motion transmitter 173 with spindle 174 of rear control handle 175. At its forward end spindle 166 has directly secured thereto the main actuating handle 176 for selecting the slow or rapid traverse preferred.

From the foregoing description taken in connection with the accompanying drawings the construction of our improved control mechanism for the adjustment and operation of knee and column type milling machines should be readily understood. It will be noted we have provided an improved machine by which a maximum variation of progressive speeds for feed or operation of the parts may be maintained with a minimum of gearing and of control devices for selectively coupling said gearing.

It will further be noted that we have provided an improved machine in which power rapid traverse is universally available for all initial adjustments of the machine; in which individual selectors are provided for coupling the respective units with the power rapid traverse drive and for selectively determining the individual direction of actuation of the several parts and in which all of these controls may be readily manipulated from either the front or rear of the machine.

It will further be noted that our improved machine embodies safety mechanism by which either the slow feeding drive or the more rapid drive may slip without breakage of the gears on undue restraint of the moving parts to be operated thereby and in which the table movement is at all times operable, but safety mechanism is provided to prevent accidental or other simultaneous engagement of the knee and saddle shifting mechanism, allowing either to be selectively operated while the other is held inoperative.

Figure 13:
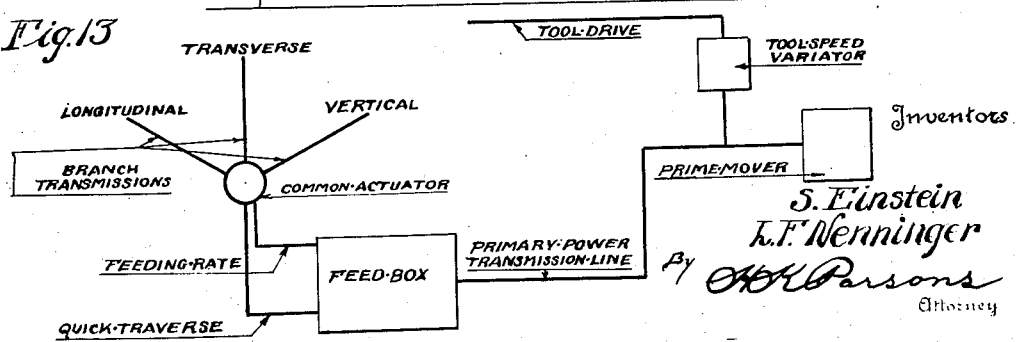
Figure 13 is a diagrammatic view of the various power transmission lines from the prime mover of the machine.
Figure 11:
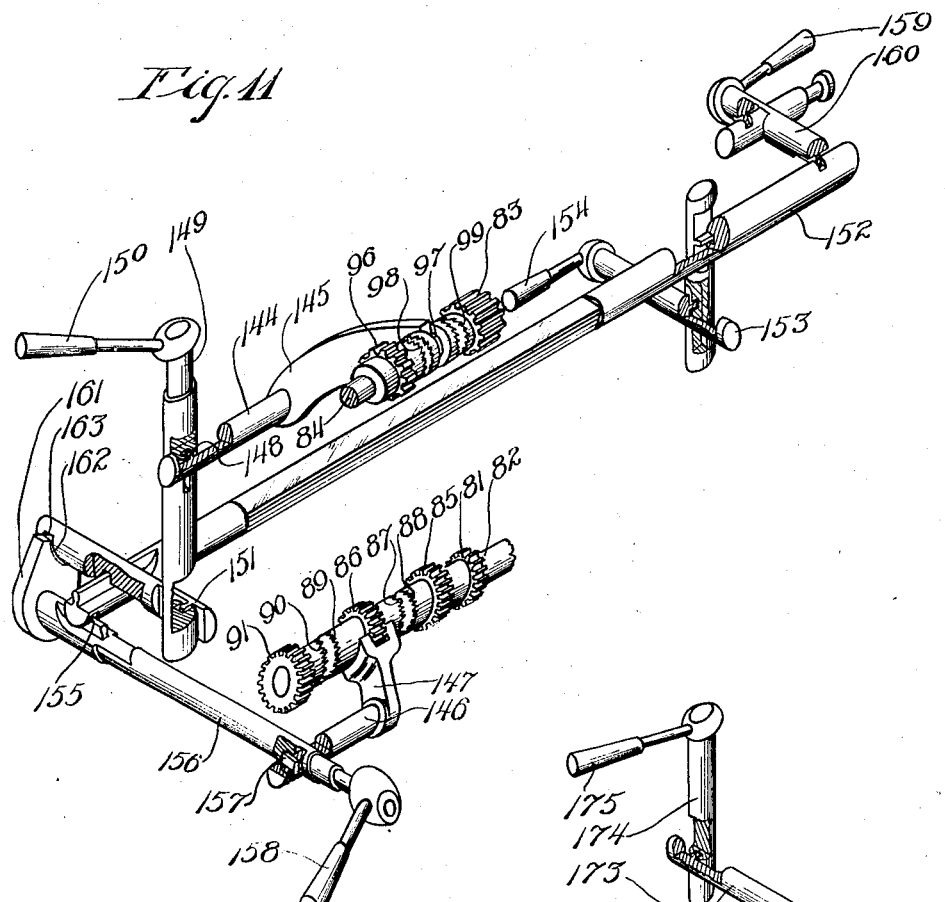
Figure 11 is a perspective view of the knee and saddle directional control mechanism disassociated from the machine.
Figure 12:
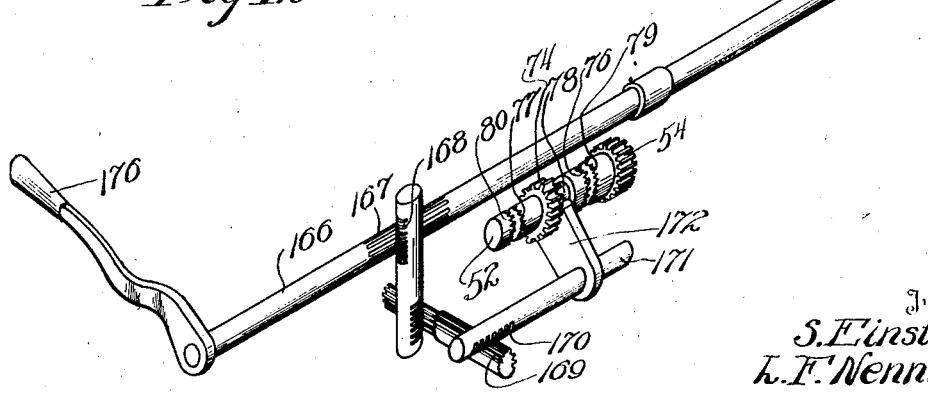
Figure 12 is a similar view of the control mechanism for rate of movement of the various parts of the machine.

That the novel power drive for effecting the several movements of the essential parts of the machine may be best understood without confusion with the specific gearing employed for attaining the results, the complete power transmission has been diagrammatically indicated in Figure 13. In this figure the several parts in place of being indicated by reference characters, have been marked according to their function or title used in the specification to describe them. By reference particularly to this view it will be noted that from the prime mover extends one transmission through the tool speed variator, forming the tool drive. In addition, there is a second transmission line extending to the feed box and emerging from the feed box in two distinct branches, one transmitting a quick traverse from the primary power transmission line and the other transmitting a feeding rate. It will be noted that exterior to the feed box these unite to supply power at the proper rate to the common actuator, which in turn operates the several branch transmissions for longitudinal transverse and vertical relative movements of the work holder and tool holder, as has previously been pointed out in connection with the specific mechanisms employed for this purpose in the embodiment here illustrated and as is hereinafter specifically claimed.

We claim:—

1. In a knee and column milling machine, the combination with a column, of a knee movable thereon, a saddle and table translatably supported by the knee, a feed box on the knee, a driven shaft for supplying power into the feed box, independent units for output of power from the feed box at either a feed or quick traverse rate, a common driver selectively operable at either of said rates, means for shifting the knee, saddle and table, and means for selectively coupling either of said shifting means with the common driver for actuation at a predetermined rate.

2. In a knee and column milling machine, the combination with a column, of a knee movable thereon, a saddle and table translatably supported by the knee, a feed box on the knee, a driven shaft for supplying power into the feed box, independent units for output of power from the feed box at either a feed or quick traverse rate, a common driver selectively operable at either of said rates, means for shifting the knee, saddle and table, means for selectively coupling either of said shifting means with the common driver for actuation at a predetermined rate, and means for preventing simultaneous engagement of all of said shifting mechanisms with the common driver.

3. A machine tool of the character described, including a plurality of shiftable units and a support therefor, power actuable means for relatively shifting the units and support, a prime mover, a feed box containing gearing operable from the prime mover, independent transmissions within the feed box, including a quick traverse drive and a variable feed drive, a reverser box mechanism containing selector clutches for determining the direction and actuation of the several power actuable shifting means, a single driver for applying power through the several clutches to their individual mechanisms, and means extending from the two transmissions aforesaid into the reverser box for selectively actuating the single driver.

4. A machine tool of the character described, including a plurality of shiftable units and a support therefor, power actuable means for relatively shifting the units and support, a prime mover, a feed box containing gearing operable from the prime mover, independent transmissions within the feed box, including a quick traverse drive and a variable feed drive, a reverser box mechanism containing selector clutches for determining the direction and actuation of the several power actuable shifting means, a single driver for applying power through the several clutches to their individual mechanisms, means extending from the two transmissions aforesaid into the reverser box for selectively actuating the common driver, and interconnected front and rear control members for actuating the several clutches from the front or rear of the machine to regulate the shifting of the several units.

5. In a machine tool of the nature described, including a plurality of relatively shiftable units, power actuable means intimately associated with the several units for controlling the shifting thereof, and means for driving the power actuable means, including a prime mover, a power shaft actuated thereby, a second shaft member, a common driver for the several shifting means loosely mounted on said shaft, a sleeve carried by the shaft, a pair of continuously operating branch transmissions intermediate the power shaft and second shaft, one of said transmissions including the sleeve and the other of said transmissions including the shaft, intermediate gearing in the transmissions whereby one of the two last named parts is operated at a quick traverse rate and the other at a variable feed rate and means for selectively coupling the common driver with either the sleeve or the shaft, whereby said driver and parts deriving actuation therefrom are operated at either a feed or a quick traverse rate.

6. In a knee and column milling machine the combination with a column of a knee movable thereon, a saddle and table translatably supported by the knee, a feed box on the knee, a driven shaft for supplying power into the feed box, independent units for output of power from the feed box at either a feed or quick traverse rate, a common driver selectively operable at either of said rates, means for shifting the knee, saddle and table, and means including individual reversing clutches for selectively coupling either of said shifting means with the common driver for actuation in a determined direction and at a predetermined rate.

7. In a knee and column milling machine the combination with a column, of a knee movable thereon, a saddle and table transltably supported by the knee, a feed box on the knee, a driven shaft for supplying power into the feed box, independent units for output of power from the feed box at either a feed or quick traverse rate, a common driver selectively operable at either of said rates, means for shifting the knee, saddle and table, means including individual reversing clutches for selectively coupling either of said shifting means with the common driver for actuation in a determined direction and at a predetermined rate, and means for preventing simultaneous engagement of all of said shifting mechanisms with the common driver.

In testimony whereof we hereunto affix our signatures.

SOL EINSTEIN.
LESTER F. NENNINGER.